US012570010B2

(12) United States Patent (10) Patent No.: US 12,570,010 B2
He et al. (45) Date of Patent: Mar. 10, 2026

(54) WORM-LIKE SOFT CRAWLING ROBOT DRIVEN BY EXERGONIC CHEMICAL REACTION

(71) Applicants: ZHEJIANG UNIVERSITY, Zhejiang (CN); OCEAN RESEARCH CENTER OF ZHOUSHAN, ZHEJIANG UNIVERSITY, Zhejiang (CN)

(72) Inventors: Zhiguo He, Zhejiang (CN); Yang Yang, Zhejiang (CN); Haipeng Wang, Zhejiang (CN); Pengcheng Jiao, Zhejiang (CN)

(73) Assignees: ZHEJIANG UNIVERSITY, Zhejiang (CN); OCEAN RESEARCHC ENTER OF ZHOUSHAN,ZHEJIANG UNIVERSITY, Zhejiang (CN)

( * ) Notice: Subject to any disclaimer, the term of this patent is extended or adjusted under 35 U.S.C. 154(b) by 725 days.

(21) Appl. No.: 17/909,437

(22) PCT Filed: May 27, 2021

(86) PCT No.: PCT/CN2021/096234
§ 371 (c)(1),
(2) Date: Sep. 6, 2022

(87) PCT Pub. No.: WO2021/258977
PCT Pub. Date: Dec. 30, 2021

(65) Prior Publication Data
US 2023/0020239 A1    Jan. 19, 2023

(30) Foreign Application Priority Data

Jun. 24, 2020    (CN) .......................... 202010591287.5

(51) Int. Cl.
*B25J 19/00* (2006.01)
*B25J 9/06* (2006.01)
*B62D 57/02* (2006.01)

(52) U.S. Cl.
CPC ........... *B25J 19/0029* (2013.01); *B25J 9/065* (2013.01); *B62D 57/02* (2013.01)

(58) Field of Classification Search
CPC ...... B25J 19/0029; B25J 9/065; B25J 9/1095; B62D 57/02
See application file for complete search history.

(56) References Cited

U.S. PATENT DOCUMENTS

2005/0007055 A1    1/2005  Borenstein et al.
2011/0214927 A1    9/2011  Yoon et al.
(Continued)

FOREIGN PATENT DOCUMENTS

CN        106114668 A  *  11/2016  ............. B62D 57/02
CN        108357654 A  *  8/2018   ............. B63C 11/52
(Continued)

OTHER PUBLICATIONS

PE2E Machine Translation of CN 106114668 A (Year: 2016).*
(Continued)

*Primary Examiner* — Jason D Shanske
*Assistant Examiner* — Al-Birr Rahman Chowdhury
(74) *Attorney, Agent, or Firm* — JCIPRNET

(57) ABSTRACT

A worm-like soft crawling robot driven by an exergonic chemical reaction, including a body system, an exothermic reaction system and a vacuum system. The body system includes a left head shell, a left flexible body shell, a left reaction chamber, a right reaction chamber, a right flexible body shell and a right head shell. Elastic transmission parts are installed in the flexible body shells in a matched way. The exothermic reaction system includes chemical fuel (Continued)

storage units and exothermic reaction stimulation devices. The vacuum system includes vacuum suction cups, vacuum exhaust tubes and vacuum pumps.

9 Claims, 3 Drawing Sheets

(56) References Cited

U.S. PATENT DOCUMENTS

| | | | | |
|---|---|---|---|---|
| 2020/0048015 | A1* | 2/2020 | Martin | ............ B65G 47/91 |
| 2020/0156237 | A1 | 5/2020 | Tang et al. | |

FOREIGN PATENT DOCUMENTS

| | | | | |
|---|---|---|---|---|
| CN | 108443641 | 8/2018 | | |
| CN | 108839722 | 11/2018 | | |
| CN | 208237337 | 12/2018 | | |
| CN | 109222764 | 1/2019 | | |
| CN | 110588815 | A * | 12/2019 | ............ B62D 57/02 |
| CN | 111806585 | 10/2020 | | |
| JP | 5606878 | 10/2014 | | |

OTHER PUBLICATIONS

PE2E Machine Translation of CN 108357654 A (Year: 2018).*
PE2E Machine Translation of CN 110588815 A (Year: 2019).*
"International Search Report (Form PCT/ISA/210) of PCT/CN2021/096234," mailed on Aug. 11, 2021, with English translation thereof, pp. 1-6.
"Written Opinion of the International Searching Authority (Form PCT/ISA/237) of PCT/CN2021/096234," mailed on Aug. 11, 2021, pp. 1-5.

* cited by examiner

WORM-LIKE SOFT CRAWLING ROBOT DRIVEN BY EXERGONIC CHEMICAL REACTION

CROSS-REFERENCE TO RELATED APPLICATION

This application is a 371 of international application of PCT application serial no. PCT/CN2021/096234, filed on May 27, 2021, which claims the priority benefit of China application no. 202010591287.5, filed on Jun. 24, 2020. The entirety of each of the above mentioned patent applications is hereby incorporated by reference herein and made a part of this specification.

TECHNICAL FIELD

The present disclosure belongs to the field of soft robots, and in particular relates to a worm-like soft crawling robot driven by an exergonic chemical reaction.

BACKGROUND

Most traditional robots are made of hard materials, often have complexer structures and poor flexibility, and may not adapt to complex-shaped channel paths. The traditional robots may not meet the needs of human beings due to some shortcomings, which prompts researchers in the field of robots to develop soft robots, and they have made great progress. Specifically, a main body of a soft robot is often made of flexible materials with larger deformation, which may be continuously deformed and change its shape and size at will. The great characteristic of the flexible materials makes the soft robot more flexible and have more potential to imitate the movements of living organisms. Since the development of the soft robots, there are various driving modes for them, unlike the traditional robots, which are often driven by motors. Specifically, the soft robots have several main driving modes of pneumatic driving, electro-active polymer driving and shape memory alloy driving. However, these driving modes have a major defect that they may not generate a fast and larger driving force. Therefore, based on this defect, the inventor team proposes a soft robot driven by an exothermic chemical reaction, which may generate violent energy in a short time, so that the soft robot may generate a driving force at least 10 times higher than that of other driving modes for the soft robot in a very short time. According to this characteristic of exothermic chemical reaction driving, this phenomenon is defined as a transient speed driving mode. Meanwhile, based on this driving mode, the inventor team proposes a worm-like soft crawling robot driven by an exothermic chemical reaction by taking a natural worm as a bionic object in combination with soft silicone materials.

SUMMARY

To make up for the defect in the prior art, the present disclosure provides a technical solution, namely, a worm-like soft crawling robot driven by an exergonic chemical reaction.

The worm-like soft crawling robot driven by the exergonic chemical reaction includes a body system, where the body system includes a left head shell, a left flexible body shell, a left reaction chamber, a right reaction chamber, a right flexible body shell and a right head shell that are connected in sequence, elastic transmission components are installed in the flexible body shells in a matched way, an inner cavity of the left reaction chamber communicates with an inner cavity of the left flexible body shell, and an inner cavity of the right reaction chamber communicates with an inner cavity of the right flexible body shell;

an exothermic reaction system, including chemical fuel storage units configured to provide chemical fuels for the reaction chambers and exothermic reaction stimulation devices configured to stimulate the reaction chambers to perform the exothermic reaction therein; and a vacuum system, including vacuum suction cups installed at the bottoms of the head shells in a matched way, vacuum exhaust tubes connected with the vacuum suction cups and vacuum pumps connected with the vacuum exhaust tubes.

In the worm-like soft crawling robot driven by the exergonic chemical reaction, the reaction chambers are of a disk-shaped structure corresponding to the shape of the flexible body shells.

In the worm-like soft crawling robot driven by the exergonic chemical reaction, the left reaction chamber and the right reaction chamber are of an integral structure.

In the worm-like soft crawling robot driven by the exergonic chemical reaction, the flexible body shells are flexible corrugated tubes capable of extending and retracting.

In the worm-like soft crawling robot driven by the exergonic chemical reaction, the elastic transmission parts are springs, each with one end connected with an inner wall of an outer end of the corresponding flexible body shell and the other end connected with an inner wall of an inner end of the corresponding reaction chamber.

In the worm-like soft crawling robot driven by the exergonic chemical reaction, the head shells are of a rigid structure.

In the worm-like soft crawling robot driven by the exergonic chemical reaction, the chemical fuel storage units are installed in inner cavities of the corresponding head shells, and are connected with chemical fuel inlets formed in the corresponding reaction chambers by tubelines.

In the worm-like soft crawling robot driven by the exergonic chemical reaction, the vacuum pumps are installed at upper ends of the corresponding head shells.

In the worm-like soft crawling robot driven by the exergonic chemical reaction, the vacuum suction cups have the function of filtration.

In the worm-like soft crawling robot driven by the exergonic chemical reaction, information acquisition units are arranged on the head shells.

The worm-like soft crawling robot driven by the exothermic chemical reaction provided in the present disclosure may convert the instantaneous high-energy exothermic chemical reaction into a longitudinal deformation of the flexible body shells; the vacuum suction cups arranged at two ends discharge air reversely before the movement starts to clean up impurities and sundries around the soft robot; and after one reaction chamber is deformed to the maximum extent, a control system starts the vacuum suction cups, a front end of the soft robot in a moving direction is fixed, and the elastic transmission parts provide a resilience force, thereby making the soft robot imitate a forward accelerated movement of the worm. During its movement, the information acquisition units outside the head shells acquire information. The soft robot has the advantages of lower manufacturing cost, simpler structure, high environmental adaptability, simple driving, etc., and may move forwards and backwards. Furthermore, the use of flexible materials with different rigidities in different parts of the flexible body shells may enable the soft robot to make a turn. The present disclosure of this design helps to overcome the shortcomings of low driving efficiency and slow movement performance of a bionic soft robot. Meanwhile, it can realize the functions of rapid start and multi-directional movement. In addition, the rigidity design of different parts of the flexible body shells is changed to realize movement forms of turning and jumping of the soft robot, thereby greatly improving the practicability of this design.

DESCRIPTION OF THE EMBODIMENTS

Figure 1:
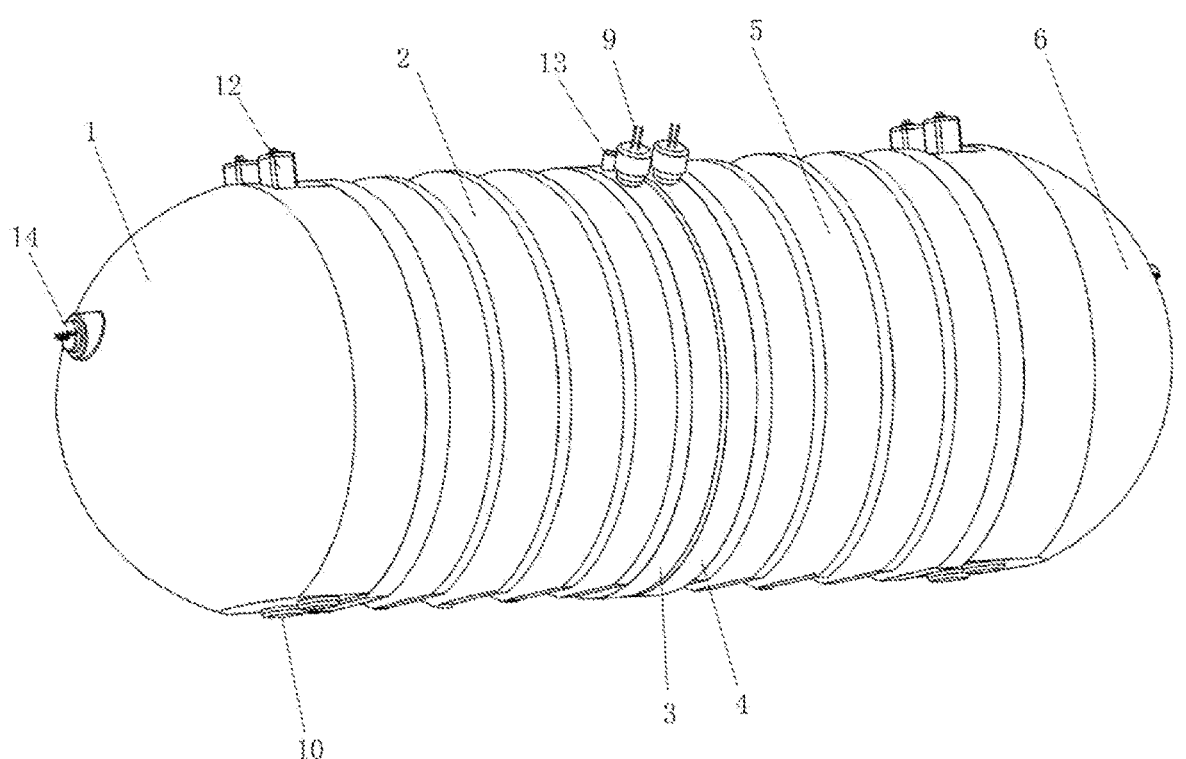
FIG. 1 is a schematic diagram of an external structure of the present disclosure.

The present disclosure is further described below in conjunction with the accompanying drawings.

As shown in figures, a worm-like soft crawling robot driven by an exergonic chemical reaction includes a body system, an exothermic reaction system and a vacuum system. The body system includes a left head shell 1, a left flexible body shell 2, a left reaction chamber 3, a right reaction chamber 4, a right flexible body shell 5 and a right head shell 6 that are connected in sequence, where the left head shell 1 and the right head shell 6 are collectively referred to as the head shell, the left flexible body shell 2 and the right flexible body shell 5 are collectively referred to as the flexible body shell, and the left reaction chamber 3 and the right reaction chamber 4 are collectively referred to as the reaction chamber. Elastic transmission parts 7 are installed in the flexible body shells in a matched way, an inner cavity of the left reaction chamber 3 communicates with an inner cavity of the left flexible body shell 2, and an inner cavity of the right reaction chamber 4 communicates with an inner cavity of the right flexible body shell 5.

The exothermic reaction system includes chemical fuel storage units 8 configured to provide chemical fuels for the reaction chambers and exothermic reaction stimulation devices 9 configured to stimulate the reaction chambers to perform the exothermic reaction therein.

The vacuum system includes vacuum suction cups 10 installed at the bottoms of the head shells in a matched way, vacuum exhaust tubes 11 connected with the vacuum suction cups 10 and vacuum pumps 12 connected with the vacuum exhaust tubes 11.

As an optimization: the reaction chambers are of a disk-shaped structure corresponding to the shape of the flexible body shells, and the reaction chambers and the corresponding flexible body shells may be of an integral structure.

As an optimization: the left reaction chamber 3 and the right reaction chamber 4 are of an integral structure, and through holes configured to communicate with the inner cavities of the corresponding flexible body shells are formed in outer sides of the reaction chambers.

As an optimization: the flexible body shells are flexible corrugated tubes capable of extending and retracting, and the flexible body shells imitate a worm in shape and are made of silicone with different rigidities.

As an optimization: the elastic transmission parts 7 are springs, each with one end connected with an inner wall of an outer end of the corresponding flexible body shell and the other end connected with an inner wall of an inner end of the corresponding reaction chamber.

As an optimization: the head shells are of a rigid structure.

In the above-mentioned structure, the chemical fuel storage units 8 are installed in inner cavities of the corresponding head shells, and are connected with chemical fuel inlets 13 formed in the corresponding reaction chambers by tubelines; and the chemical fuel storage units 8 may be gas tanks storing gas. The exothermic reaction stimulation devices 9 are arranged on the corresponding reaction chambers, and the exothermic reaction stimulation devices 9 may be electric spark generators.

In the above-mentioned structure, the vacuum pumps 12 are installed at upper ends of the corresponding head shells.

In the above-mentioned structure, suction ports of the vacuum suction cups 10 are of a mesh-shaped structure, so that the vacuum suction cups 10 have the function of filtration.

In the above-mentioned structure, information acquisition units 14 are arranged on outer sides of the head shells, and the information acquisition units 14 may be image acquisition sensors, temperature sensors, humidity sensors or other structures.

Figure 2:
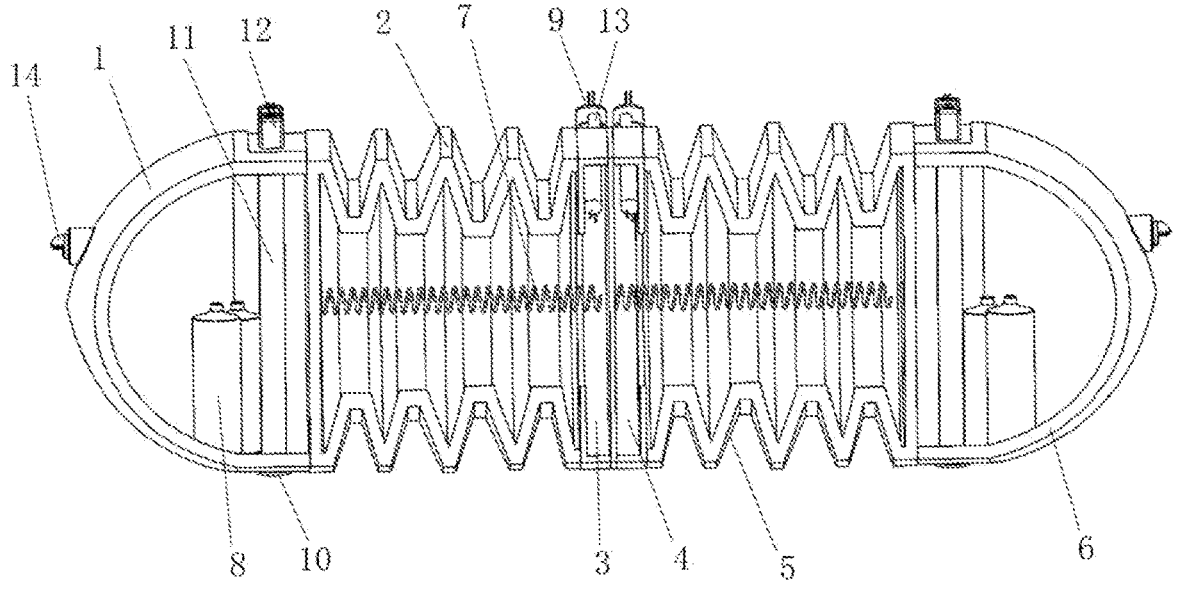
FIG. 2 is a first schematic diagram of an internal structure of the present disclosure, and at this time, the present disclosure is in a undriven state.
Figure 3:
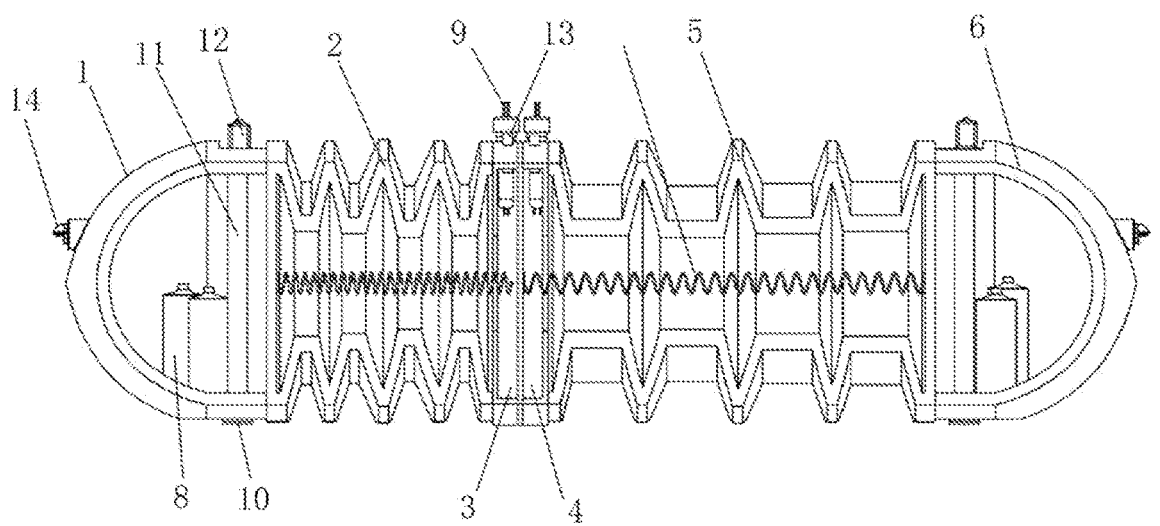
FIG. 3 is a second schematic diagram of the internal structure of the present disclosure, and at this time, the present disclosure is in a driven state.
Figure 4:
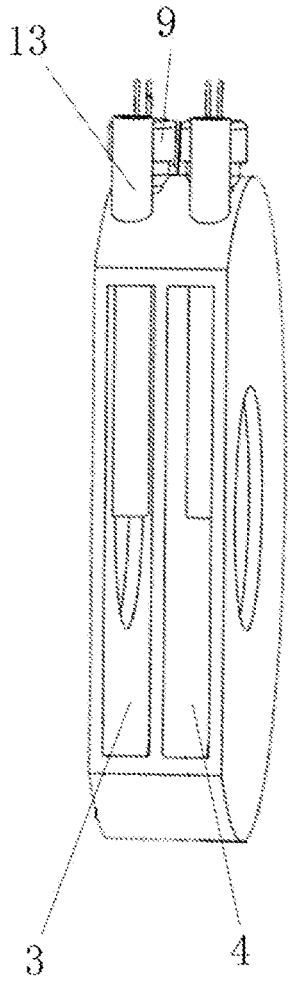
FIG. 4 is a schematic cross-sectional view of a left reaction chamber and a right reaction chamber in the present disclosure.
Figure 5:
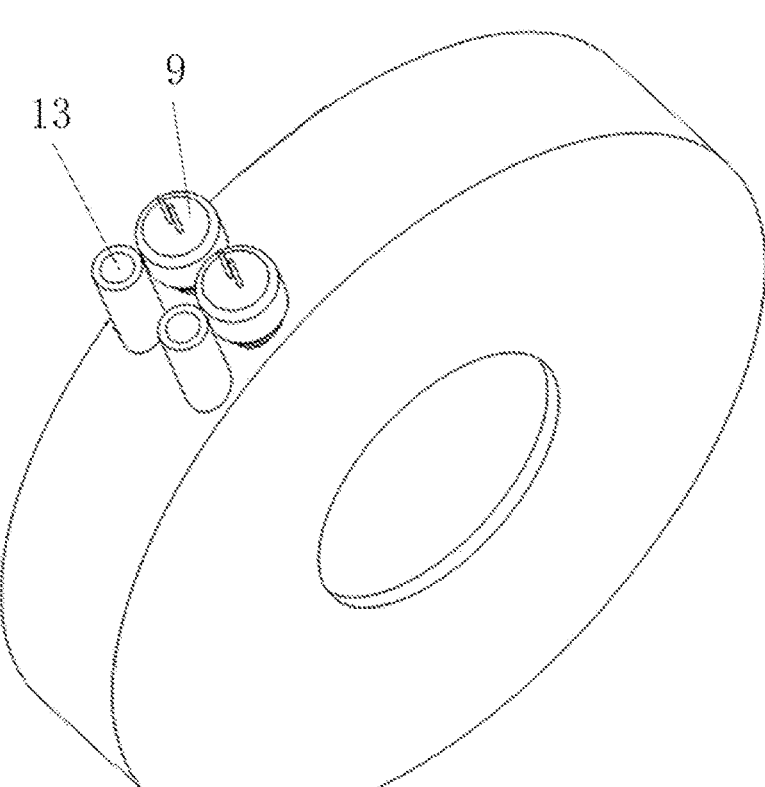
FIG. 5 is a schematic structural diagram of the left reaction chamber and the right reaction chamber in the present disclosure.
Figure 6:
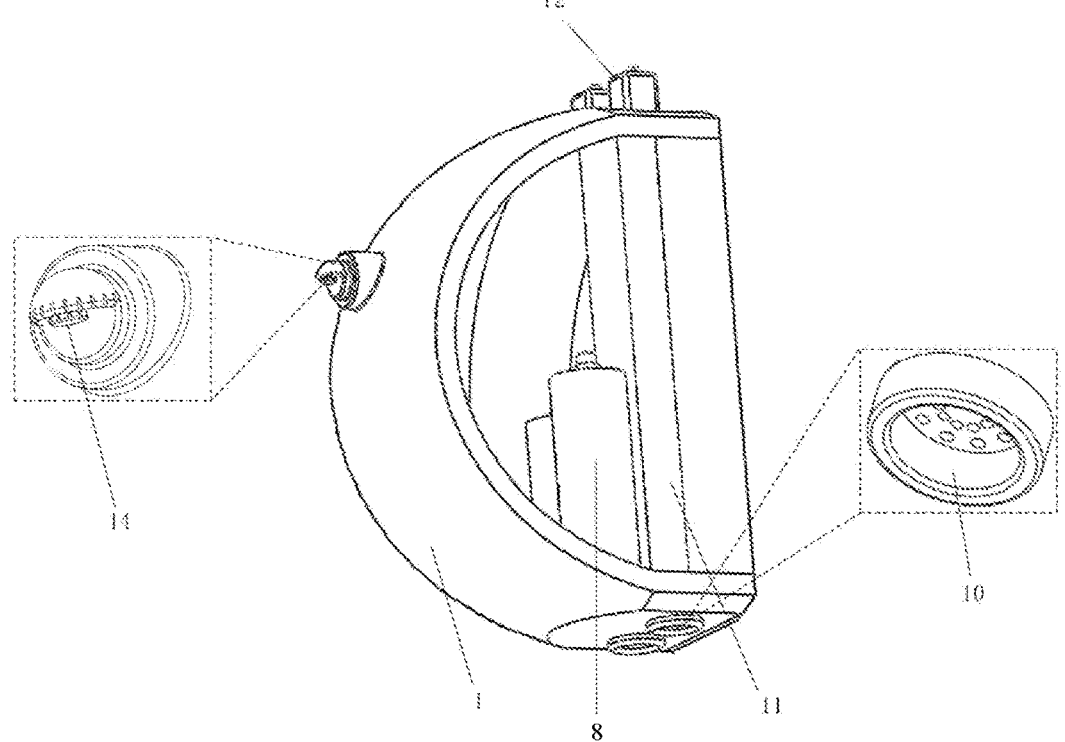
FIG. 6 is a schematic cross-sectional view of a left head shell in the present disclosure.

A working principle of a driving process of the worm-like soft robot is explained by taking contents shown in FIGS. 1-6 as an example. The present disclosure is equipped with a well-known control system to control work of the soft robot. Before the start of driving, impurities on the ground around the soft robot are cleaned up by the vacuum system that increases frictional resistance. After the cleaning, the ground is sucked by the vacuum suction cup 10 on a left side for fixation, and the chemical fuel storage units 8 on two sides inject mixed combustible gas (such as propane and oxygen mixed gas) into the corresponding reaction chambers by the corresponding chemical fuel inlets 13. After the gas injection, valve ports are closed. If the soft robot is required to move rightwards, the exergonic reaction stimulation devices 9 are stimulated by the control system, and the exothermic reaction stimulation devices 9 generate electric sparks instantly to stimulate the exothermic chemical reaction of the right reaction chamber 4. Under the condition of the high-energy chemical reaction, a very high internal pressure is generated in the right flexible body shell 5 connected with the right reaction chamber 4 in a short time to push the right flexible body shell 5 to move forwards. When a movement deformation reaches the maximum, the control system rapidly controls the vacuum suction cup 10 on a right side to perform vacuumization to suck the ground, and meanwhile releases the vacuum suction cup 10 on the left side. The elastic transmission parts 7 providing a resilience force will make the soft robot retract in a direction of moving rightwards, thereby enabling the soft robot to move forwards. During the movement, the information acquisition units 14 on two sides are started to acquire information.

Likewise, when the soft robot needs to move reversely, a driving process of work is similar and will not be repeatedly described here.

From the accompanying drawings in the description, it may be seen that after the high pressure of the chemical reaction in the right reaction chamber 4 acts on the right flexible body shell 5, the soft robot fixed by the vacuum suction cup 10 on the left side moves rightwards to a furthest position, thus, under the control system, the vacuum suction cup 10 on the right side rapidly fixes the soft robot, the vacuum suction cup 10 on the left side rapidly releases air pressure, and meanwhile, the elastic transmission part 7 on a right side provides the residence force, thereby enabling the soft robot to complete the movement.

It should be noted that the "inner end" in the above description refers to the side close to the center of the soft robot, and the "outer end" refers to the side away from the center of the robot. The "left" and "right" in the above description are only used to illustrate the technical solution of the present disclosure, but not to limit it.

Finally, it should be noted that the above embodiments are only used to illustrate the technical solution of the present disclosure, but not to limit it; although the present disclosure has been described in detail with reference to the above-mentioned embodiments, those of ordinary skill in the art should understand that: they still may modify the technical solution described in the above-mentioned embodiments, or equivalently replace part or all of technical features in the technical solution; and these modifications or replacements do not make the essence of the corresponding technical solution depart from the scope of the technical solution of the embodiments of the present disclosure.

What is claimed is:

1. A worm-like soft crawling robot driven by an exergonic chemical reaction, comprising
   a body system, wherein the body system comprises a left head shell, a left flexible body shell, a left reaction chamber, a right reaction chamber, a right flexible body shell and a right head shell connected in sequence, elastic transmission parts are installed in the flexible body shells in a matched way, an inner cavity of the left reaction chamber communicates with an inner cavity of the left flexible body shell, and an inner cavity of the right reaction chamber communicates with an inner cavity of the right flexible body shell;
   an exothermic reaction system, comprising chemical fuel storage units configured to provide chemical fuels for the reaction chambers and exothermic reaction stimulation devices configured to stimulate the reaction chambers to perform the exothermic reaction therein; and
   a vacuum system, comprising vacuum suction cups installed at bottoms of the head shells in a matched way, vacuum exhaust tubes connected with the vacuum suction cups and vacuum pumps connected with the vacuum exhaust tubes,
   wherein the elastic transmission parts are springs, each with one end connected with an inner wall of an outer end of the corresponding flexible body shell and the other end connected with an inner wall of an inner end of the corresponding reaction chamber.

2. The worm-like soft crawling robot driven by an exergonic chemical reaction according to claim 1, wherein the reaction chambers are of a disk-shaped structure corresponding to the shape of the flexible body shells.

3. The worm-like soft crawling robot driven by an exergonic chemical reaction according to claim 1, wherein the left reaction chamber and the right reaction chamber are of an integral structure.

4. The worm-like soft crawling robot driven by an exergonic chemical reaction according to claim 1, wherein the flexible body shells are flexible corrugated tubes capable of extending and retracting.

5. The worm-like soft crawling robot driven by an exergonic chemical reaction according to claim 1, wherein the head shells are of a rigid structure.

6. The worm-like soft crawling robot driven by an exergonic chemical reaction according to claim 1, wherein the chemical fuel storage units are installed in inner cavities of the corresponding head shells, and are connected with chemical fuel inlets formed in the corresponding reaction chambers by tubelines.

7. The worm-like soft crawling robot driven by an exergonic chemical reaction according to claim 1, wherein the vacuum pumps are installed at upper ends of the corresponding head shells.

8. The worm-like soft crawling robot driven by an exergonic chemical reaction according to claim 1, wherein the vacuum suction cups have the function of filtration.

9. The worm-like soft crawling robot driven by an exergonic chemical reaction according to claim 1, wherein information acquisition units are arranged on the head shells.

* * * * *